V. LIKELY.
COMBINED DISH AND VEGETABLE WASHER AND FRUIT CANNER.
APPLICATION FILED NOV. 3, 1913.

1,149,656.

Patented Aug. 10, 1915.
2 SHEETS—SHEET 1.

Witnesses

Inventor
V. Likely,
Attorneys.

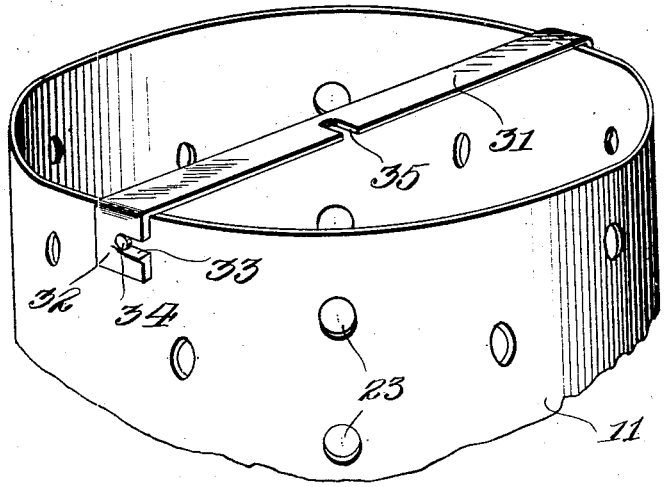
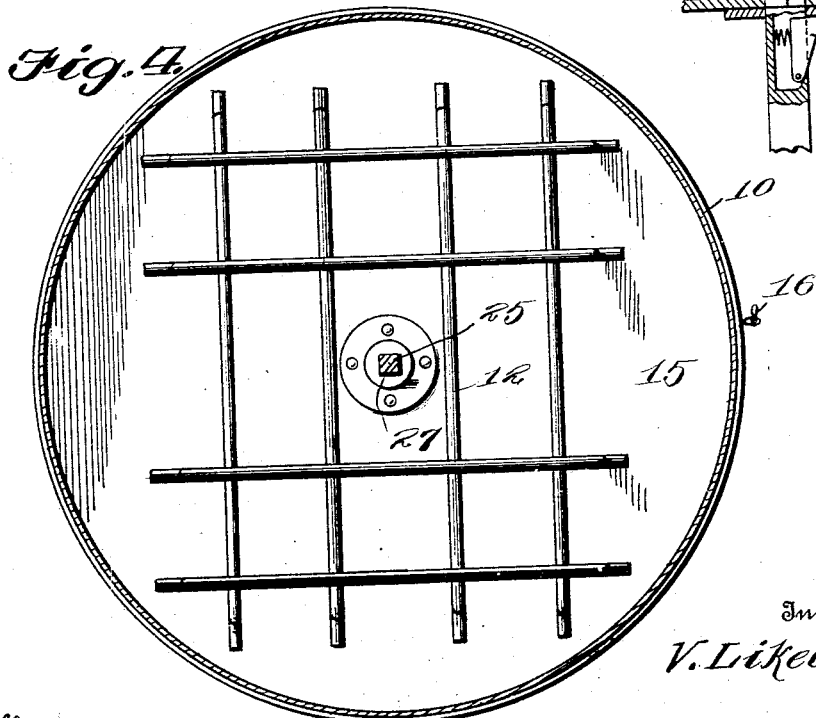

UNITED STATES PATENT OFFICE.

VIOLA LIKELY, OF SALINA, KANSAS.

COMBINED DISH AND VEGETABLE WASHER AND FRUIT-CANNER.

1,149,656.

Specification of Letters Patent.

Patented Aug. 10, 1915.

Application filed November 2, 1913. Serial No. 798,984.

*To all whom it may concern:*

Be it known that I, VIOLA LIKELY, citizen of the United States, residing at Salina, in the county of Saline and State of Kansas, have invented certain new and useful Improvements in Combined Dish and Vegetable Washers and Fruit-Canners, of which the following is a specification.

My invention relates to new and useful improvements in washing machines for washing either dishes or fruit, the object of my invention being the provision of a washing machine of the above described character which may also be used for canning fruit and vegetables with equal efficiency. In this connection I provide a vessel for holding the water or other washing fluid and an inner vessel for holding the dishes, fruit or other articles to be washed, making provision for supporting the inner vessel with its bottom above the bottom of the outer vessel in order to insure complete drainage of the articles washed upon draining of the outer receptacle.

A further object of my invention is to provide a perforated casing which is fastened within the inner vessel and within which is mounted a dasher by means of which a constant circulation of water in the various vessels may be maintained.

A still further object of my invention is to so arrange this inner vessel and dasher that the dasher may be readily removed from the rest of the device when the machine is to be used for the purpose of canning fruit or vegetables.

With these and other objects in view, my invention will be more fully described, illustrated in the accompanying drawings, and then specifically pointed out in the claims which are attached to and form a part of this application.

Figure 1:
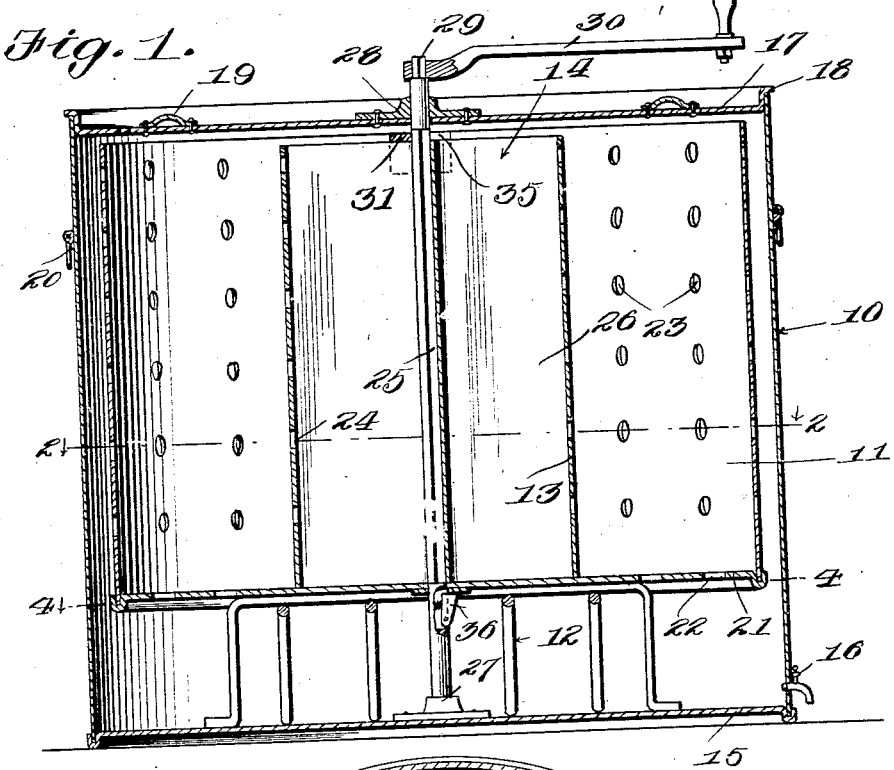
Figure 2:
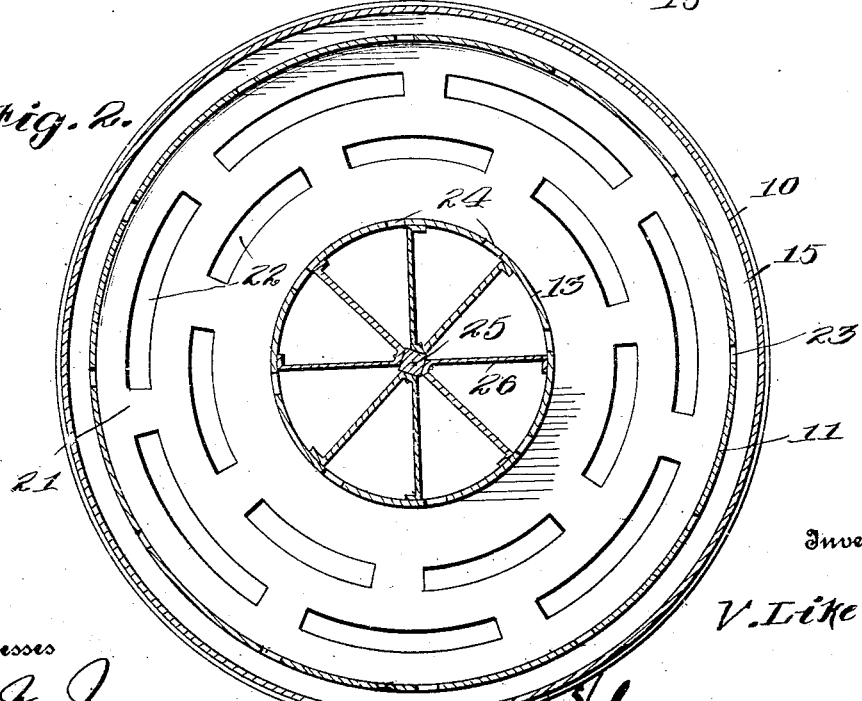

In the drawings:—Figure 1 is a central vertical sectional view through my improved device, showing the manner of employing the same as a dish washer; Fig. 2 is a transverse sectional view on the line 2—2 of Fig. 1; Fig. 3 is a fragmentary perspective view of the inner vessel, showing a separable brace forming a handle by means of which the vessel may be conveniently positioned in the outer vessel or removed therefrom; Fig. 4 is a transverse sectional view on the line 4—4 of Fig. 1, showing the construction of the support employed in holding the inner vessel in place; Fig. 5 is a detail view of a spring catch employed.

Corresponding and like parts are referred to in the following description and indicated in all the views of the drawings by the same reference characters.

As previously mentioned, the preferred embodiment of my invention primarily includes an outer vessel 10, inner vessel 11, support 12 for the inner vessel, perforated casing 13, and dasher 14.

The outer vessel may be of any desired shape, being preferably cylindrical and provided with a bottom 15, both the vessel proper and its bottom being imperforate. A drain cock 16 communicates with the lower portion of the outer vessel and affords means for draining all liquid therefrom. In use the outer vessel is closed by an imperforate cover 17 which seats within the upper end of said vessel and which is provided with an upwardly and outwardly directed peripheral flange or lip 18 seating upon the upper edge of the outer vessel. This cover is provided with handles 19 and for the sake of convenience the outer vessel is also preferably provided with swinging handles 20.

The inner vessel 11 is also preferably cylindrical in shape and closed at its lower end by a bottom 21 provided with a plurality of drain openings 22. The body portion proper of the inner vessel is also provided with a plurality of perforations 23 through which the water or other liquid in the vessels may circulate. The perforations 22 formed in the bottom of the inner vessel are preferably arcuate in shape as shown in Fig. 2 in order that plates, platters and other dishes may have their edge portions passed therethrough to properly support them in place. The inner vessel is somewhat less in diameter than the outer vessel and is supported with its bottom in spaced relation above the bottom of the outer vessel 15 by the supporting frame 12 which may be of any desired construction and which is preferably formed of wire, as clearly shown in Figs. 1 and 4 of the drawings. A cylindrical casing, previously indicated by the numeral 13, is secured centrally within the inner vessel. This casing is open at both ends, seating by its lower end upon the bottom of the inner vessel and is provided with a plurality of perforations 24 permitting free circulation of water therethrough. The dasher 14 is used in connection with this casing and comprises a shaft 25 carrying a plurality of radial blades 26, these blades extending throughout the entire length of the casing and bearing against the inner face thereof. These blades are preferably formed in pairs by bending a strip of sheet metal medially and riveting, bolting or otherwise securing its medial portion to the shaft 25, this shaft being square in cross section to facilitate such fastening.

The bottom 21 of the inner vessel is provided with a square opening for the passage of the lower end of the shaft 25 and the bottom 15 of the outer vessel is provided centrally with a socket 27 to receive the lower end of the shaft, the lower end which seats in said socket being circular in cross section. The top 17 is provided centrally with a reinforcing plate 28 forming a bearing for the upper end of the shaft, this end also being circular in cross section but having its terminal squared as at 29 to receive a hand crank 30 by means of which the dasher, casing and inner vessel may be rotated.

A brace strip 31 extends diametrically across the upper end of the inner vessel 11 having its ends downturned as at 32 and notched as at 33 for detachable engagement with outwardly directed studs 34 carried by the inner vessel 13. This strip braces the inner vessel 13 and also serves as a detachable handle to assist in raising and lowering the same. The strip, centrally, is cut-away or notched as at 35 to engage the shaft 25.

The body portions of the inner and outer vessels, the casing 13, cover of the outer vessel and blades of the washer are all preferably formed of sheet metal of suitable weight and strength, all of said parts being preferably galvanized, tinned or otherwise coated to prevent rust and corrosion.

When employing the device as a dish washer, the plates, saucers and like dishes are positioned in the slots in the bottom of the inner vessel and the other dishes so positioned among them as to be held against movement. The outer vessel is then filled with water to a level above that of the dishes, soap being added to the water. After the dishes have stood in this soap and water for a short time, the crank handle is either rotated or oscillated back and forth to agitate the water contained in the vessel, forcing the same among the dishes to thoroughly cleanse them. The drain cock is then opened and all water drained off, after which the cock is closed and the dishes rinsed by pouring hot water upon them. The cover may then be removed and the dishes left in the inner vessel to dry.

When washing vegetables or fruit, the vegetables or fruit, as the case may be, are covered with water and the water in the vessel agitated as above described, after which the water is drained off.

When employing the device for canning purposes the dasher is removed. The fruit to be canned is placed in jars and the jars positioned in the inner vessel about the casing 13. The outer vessel is filled with water to a level slightly below the bottom of the inner vessel and the device placed upon a stove. As the water contained in the outer vessel boils away, fresh hot water to replace it may be supplied by pouring the additional water into the outer vessel through the casing 14, the casing thus serving to prevent the passage of such water into the jars of fruit being canned. Except when replenishing the supply of water, the outer vessel should be kept closely covered. If desired, an additional support for the inner vessel may be supplied by providing a spring catch 36 extending from the shaft 25, as shown in Fig. 1, this catch normally extending from the shaft but being movable into a seat formed therein. This arrangement permits the shaft to be passed through the bottom of the inner vessel 11, after which it will spring out and bear against the bottom to support the inner vessel.

It will of course be understood that I do not wish in any way to limit myself to the specific details of construction as various minor changes, within the scope of the appended claims, may be made at any time, without in the slightest degree departing from the spirit of my invention.

Having thus described the invention, what is claimed as new is:

1. A device of the character described including an outer imperforate vessel, an inner perforate vessel, a perforate casing secured in the inner vessel, and a dasher mounted in the casing to rotate the casing and inner vessel, said dasher including a plurality of vertically disposed blades extending throughout the length of the casing and bearing at their free edges against the inner face thereof.

2. A device of the character described including an outer imperforate vessel, an inner perforate vessel, a perforate casing secured in the inner vessel, and a dasher mounted in the casing to rotate it and the inner vessel, said dasher including a plurality of vertically disposed blades extending throughout the length of the casing and bearing at their free edges against the inner face thereof, the free edges of said blades being laterally bent.

3. A device of the character described including an outer imperforate vessel having a bottom, a top, alined bearings formed in the top and bottom, a shaft journaled in the bearings, a normally extended spring catch carried by the shaft, and an inner perforate vessel surrounding the shaft to rotate therewith and supported by engagement of its bottom upon the catch.

In testimony whereof I affix my signature in presence of two witnesses.

MRS. VIOLA LIKELY. [L. S.]

Witnesses:
R. P. CRAVENS,
S. V. ANDREWS.